US010107910B2

(12) United States Patent
Johnson et al.

(10) Patent No.: US 10,107,910 B2
(45) Date of Patent: Oct. 23, 2018

(54) OBJECT DETECTION SYSTEM

(71) Applicant: Goodrich Corporation, Charlotte, NC (US)

(72) Inventors: James B. Johnson, Medford, MA (US); Michael C. Marden, Merrimac, MA (US); Ian P. Humphrey, Foxboro, MA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/376,165

(22) Filed: Dec. 12, 2016

(65) Prior Publication Data
US 2018/0164436 A1 Jun. 14, 2018

(51) Int. Cl.
G01S 17/00 (2006.01)
G08G 5/00 (2006.01)
B64D 39/00 (2006.01)
B64D 47/08 (2006.01)
G01S 17/02 (2006.01)
G01S 17/42 (2006.01)
G01S 17/93 (2006.01)
G08G 5/04 (2006.01)

(52) U.S. Cl.
CPC ............ G01S 17/023 (2013.01); B64D 39/00 (2013.01); B64D 47/08 (2013.01); G01S 17/42 (2013.01); G01S 17/933 (2013.01); G08G 5/045 (2013.01)

(58) Field of Classification Search
CPC ........ G01S 17/00; G01S 17/023; G01S 17/42; G01S 17/933; B64D 39/00; G08G 5/045
See application file for complete search history.

(56) References Cited

U.S. PATENT DOCUMENTS

| 3,897,250 | A | * | 7/1975 | Weishaupt | G03B 15/00 355/52 |
| 3,917,196 | A | * | 11/1975 | Pond | B64D 39/00 244/135 A |
| 4,264,044 | A | * | 4/1981 | White | B64D 39/00 244/118.6 |
| 4,834,531 | A | * | 5/1989 | Ward | B64G 1/646 244/172.4 |

(Continued)

FOREIGN PATENT DOCUMENTS

| EP | 2769910 A2 | 8/2014 |
| EP | 2933656 A1 | 10/2015 |
| EP | 3203266 A1 | 8/2017 |

OTHER PUBLICATIONS

Extended European Search Report, of the European Patent Office, dated Apr. 17, 2018, issued in corresponding European Patent Application No. 17205994.1.

Primary Examiner — Yonel Beaulieu
(74) Attorney, Agent, or Firm — Locke Lord LLP; Scott D. Wofsy; Christopher J. Cillié

(57) ABSTRACT

An in-flight detection system includes a camera mounted to a platform aircraft configured to define a field of regard containing a target aircraft. A lidar system is mounted to the platform aircraft and is configured to continuously scan the field of regard defined by the camera. The lidar system determines position data between the platform aircraft and the target aircraft. A controller is operatively connected to the camera and the lidar system and is configured to activate the lidar system after the camera defines the field of regard.

20 Claims, 3 Drawing Sheets

(56) References Cited

U.S. PATENT DOCUMENTS

| | | | | |
|---|---|---|---|---|
| 5,490,075 A | * | 2/1996 | Howard | B64G 1/646 |
| | | | | 701/23 |
| 5,493,392 A | * | 2/1996 | Blackmon | B64G 1/22 |
| | | | | 244/171 |
| 6,604,711 B1 | | 8/2003 | Stevens et al. | |
| 7,180,476 B1 | * | 2/2007 | Guell | G01S 19/15 |
| | | | | 340/980 |
| 9,150,310 B1 | * | 10/2015 | Bray | B64D 39/00 |
| 9,650,138 B2 | * | 5/2017 | Yates | B64D 33/00 |
| 2010/0217526 A1 | * | 8/2010 | McElveen | B64D 39/00 |
| | | | | 701/300 |
| 2010/0321011 A1 | * | 12/2010 | Small | B64C 39/024 |
| | | | | 324/239 |
| 2011/0261188 A1 | | 10/2011 | Adarve Lozano | |
| 2013/0278428 A1 | * | 10/2013 | Icove | G01K 11/006 |
| | | | | 340/584 |
| 2013/0342657 A1 | | 12/2013 | Robertson | |
| 2016/0340006 A1 | * | 11/2016 | Tang | B63C 9/01 |

* cited by examiner ns within the
OBJECT DETECTION SYSTEM

BACKGROUND OF THE INVENTION

1. Field of the Invention

This invention relates to the aerial refueling of unmanned or optionally piloted vehicles and more particularly to a detection system for locating and tracking an unmanned or optionally piloted vehicle.

2. Description of Related Art

Aerial refueling of military aircraft, such as jet fighters and helicopters, has been done for years. Typically, a tanker aircraft carrying fuel extends a flying boom or probe beneath the tanker aircraft. A pilot maneuvers the receiving aircraft beneath the probe, connecting the probe to a receptacle on the exterior of the receiving aircraft. The tanker aircraft supplies fuel to the receiving aircraft once the probe is coupled to the receiving aircraft.

Autonomous airborne refueling requires the capability of locating the tanker and fuel boom so that a platform aircraft can position itself correctly. The platform aircraft needs to track the position of the fuel line of a target aircraft and adjust course until the fuel line couples with a mating boom on the platform aircraft.

Thus, it would be beneficial to provide a more reliable system that would allow an autonomous aircraft to safely and efficiently rendezvous with a tanker aircraft for aerial refueling. As a result, the autonomous aircraft may be used on longer and/or more complex missions.

The conventional techniques have been considered satisfactory for heir intended purpose. However, there is an ever present need for improved autonomous detection system.

SUMMARY OF THE INVENTION

An object detection system includes a camera mounted to a platform aircraft configured to define a field of regard containing a target aircraft. A lidar system is mounted to the platform aircraft configured to continuously scan the field of regard defined by the camera and determine position data between the platform aircraft and the target aircraft. A controller is operatively connected to the camera and the lidar system configured to activate the lidar system after the camera defines the field of regard.

The camera can define the field of regard based on thermal signature produced from the target aircraft. The lidar system can include at least one laser configured to direct an optical beam within the field of view and a detection system configured to receive a reflected portion of the optical beam from the field of view. The lidar system can further include a scanning mechanism having a mirror, positioning motors and encoders or resolvers to determine pointing angle. The scanning mechanism is configured to point the lidar laser and receiver within the field of regard.

The detection system can further include a processor operatively connected to the camera and a lidar device connected to a memory. The memory can include instructions recorded thereon that, when read by the processor, cause the processor to receive the portion of the laser beam from the field of view and provide distance to the target aircraft.

The memory can be configured to store coordinates of the field of regard. The controller can be operatively connected to the memory and configured to trigger the memory to maintain the lidar system pointing and scanning within the coordinates of the field of regard. The camera and lidar system can be mounted for scanning the target aircraft when the target aircraft is positioned above the platform aircraft.

In certain embodiment, the detection system can further include a control unit on the platform aircraft operatively connected to the controller. The control unit can be arranged to control the platform aircraft to steer the platform aircraft to a position for connecting a fuel feeder and nozzle of the target aircraft to the platform aircraft. The lidar system can be configured provide a three dimensional image to determine a location of the fuel feeder.

In certain other embodiments, the control unit on the platform aircraft can be operatively connected to a control unit on the target aircraft and can be arranged to steer the target aircraft to avoid airborne objects.

A method of detecting an object includes the steps of triggering a camera mounted to a platform aircraft to define a field of regard containing a target aircraft. The field of regard coordinates are communicated to a controller operatively connected to the camera and a lidar system operatively connected to the controller and mounted to the platform aircraft is activated to continuously scan the field of regard defined by the camera. The lidar system next determines position data between the platform aircraft and the target aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
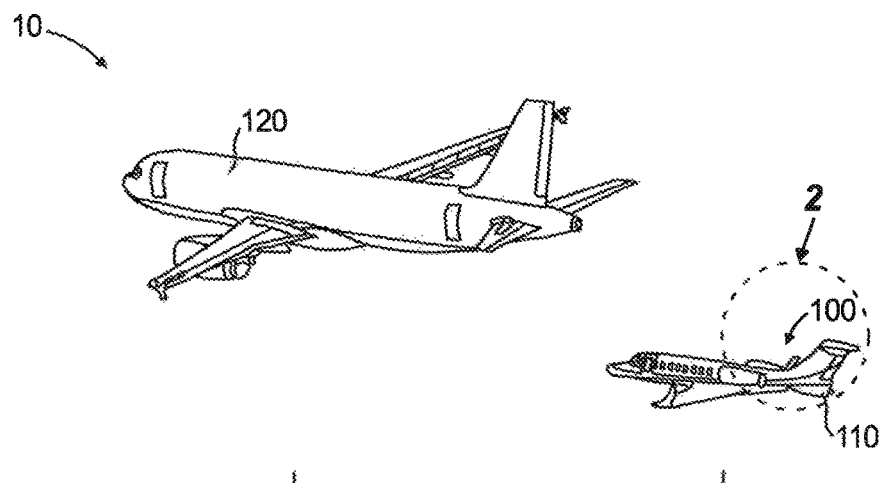
FIG. 1 is a perspective view of a target aircraft and platform aircraft having the object detection system of the present invention, showing the location of the system on the platform aircraft.

Reference will now be made to the drawings wherein like reference numerals identify similar structural features or aspects of the subject disclosure. For purposes of explanation and illustration, and not limitation, a partial view of an exemplary embodiment of the object detection system in accordance with the disclosure is shown in FIG. 2 and is designated generally by reference character 100. Other embodiments of the object detection system in accordance with the disclosure, or aspects thereof, are provided in FIGS. 1, 3-5, as will be described. The systems and methods described herein can be used locate an airborne target.

Figure 2:
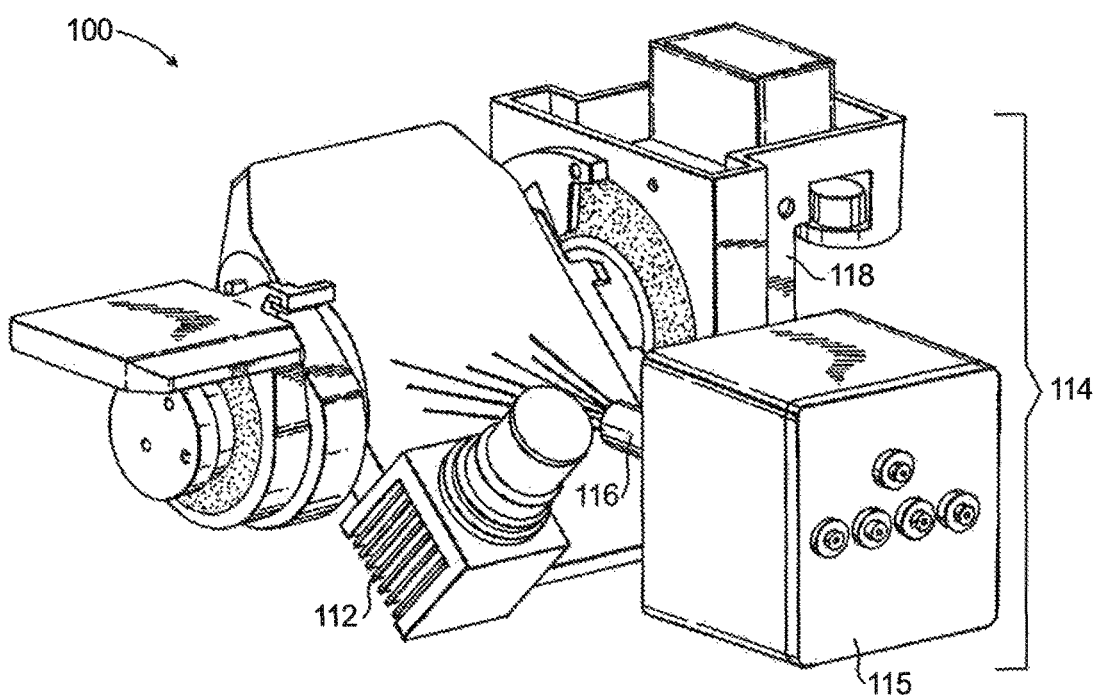
FIG. 2 is a perspective view of the object detection system of FIG. 1, showing a camera, a lidar system, and an optical scanning mechanism.

FIG. 1 is a simplified aerial drawing showing two unmanned aerial vehicles (UAVs) in flight flying in close proximity to effect autonomous refueling in accordance with the present disclosure. As shown in FIG. 1, the system 10 includes a mission/platform aircraft 110 and a tanker/target aircraft 120. Each aircraft 110, 120 has an airframe, control surfaces and guidance, navigation, communication and propulsion systems as is common in the art. As shown in FIGS. 1 and 2, the object detection system 100 of the present disclosure includes a camera 112 and lidar system 114 positioned at the tail end of the platform aircraft 110 configured to view the target aircraft 120 above. Preferably, the detection system 100 is positioned to view the surrounding area through a window in the surface of an upper portion of the platform aircraft 110.

Figure 3:
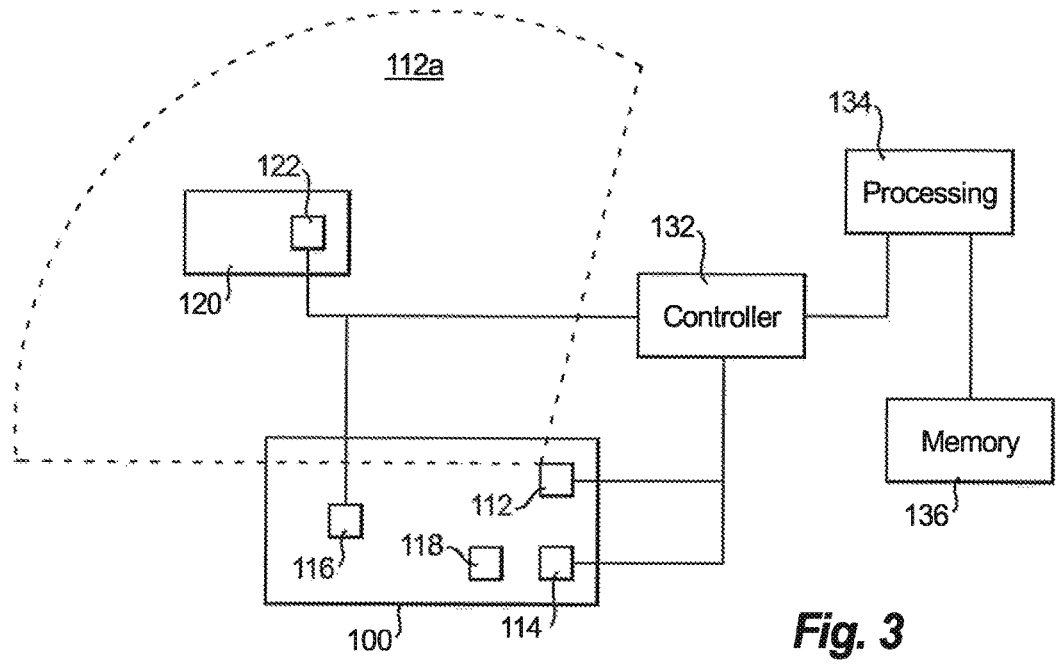
FIG. 3 is a schematic view of an exemplary embodiment of the object detection system of FIG. 2 constructed in accordance with the present disclosure, showing a wide area scanning region of the camera.
Figure 4:
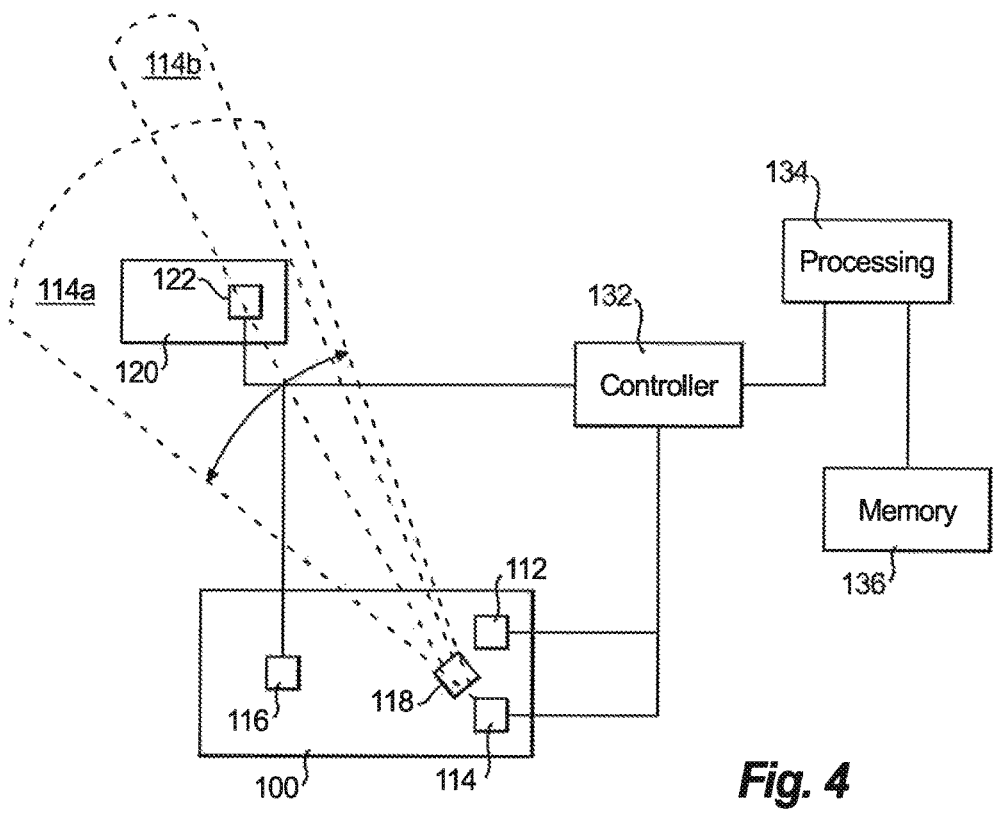
FIG. 4 is a schematic view of the object detection system of FIG. 2, showing a field of view defined by the camera and scanned by the lidar system.
Figure 5:
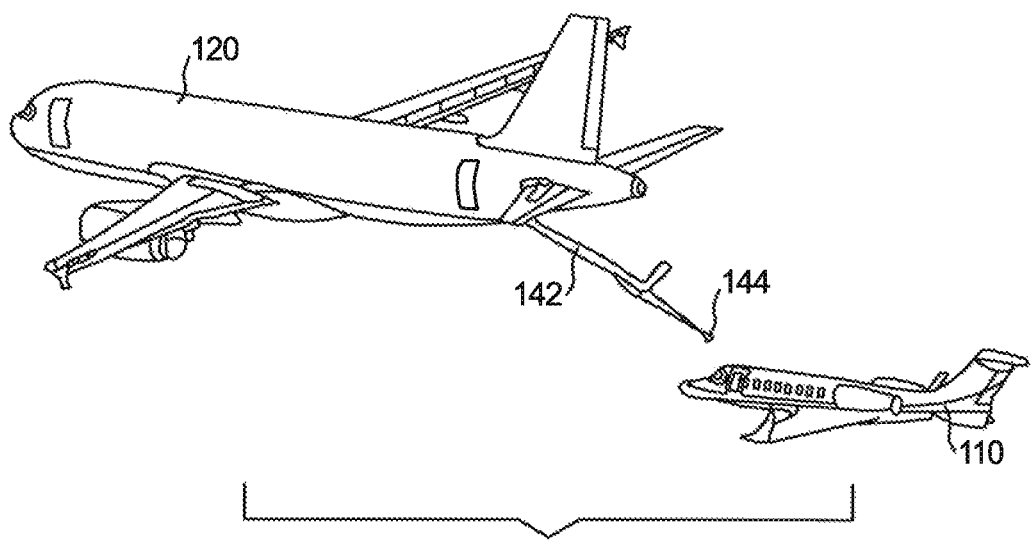
FIG. 5 is a perspective view perspective view of the target aircraft and platform aircraft of FIG. 1, showing a fuel feeder.

With reference to FIG. 3, a schematic view of the object detection system 100 is shown. The detection system 100 is a two stage system using a camera 112 and a three dimensional lidar system 114. During the first stage, the camera 112, preferably a wide area camera, potentially IR, searches for a heat or thermal signature of the target aircraft 120 to estimate the relative location. As shown in FIG. 2, the camera 112 searches over a relatively large area 112a surrounding a previously communicated potential position of the target aircraft (i.e., a holding pattern communicated over radio using GPS). The camera 112 continues to search over the area 112a until a field of regard 114a (shown in FIG. 4) is defined which includes the location of the target aircraft 120. Typically, as the platform aircraft 110 approaches the target aircraft 120 the distance is unknown, therefore the camera 110 is used to scan a wide area and narrow the location of the target aircraft 120. The field of regard 114a may range in size based on the confidence of the thermal signature and size of the target aircraft 120.

Once the camera 112 has defined the field of regard 114a, a controller 132 operatively connected to the camera 112 and lidar system 114, activates the second stage of the system, the lidar system 114. The controller 132 triggers and points the lidar system 114 field of view 114b to continuously scan the field of regard 114a defined by the camera, shown in FIG. 4. Typical in-flight navigation systems may use lidar to locate and pin point the exact location and distance of the target aircraft. However, continuously scanning the relatively large area 112a is costly.

The two stage detection system 100 described herein allows a two dimensional image from the camera 112 to locate the relative location of the target aircraft 120 as the platform aircraft 110 approaches and narrows the field of regard. The lidar system 114 further provides more accurate ranging and/or a three dimensional model of the target aircraft 120. For autonomous refueling this allows for improved imaging and necessary adjustments to locate a fuel feeder 142 and nozzle 144 (shown in FIG. 5) of the target aircraft 120 compared to using a camera by itself.

The lidar system 114 includes a lidar receiver 115 and at least one laser 116 configured to direct an optical beam within the field of regard 114a defined by the camera 112. A scanning mechanism 118 including a mirror, positioning motors, and encoders or resolvers to determine pointing angle scans the lidar field of view 114b and a detection system part of the lidar receiver 115 is configured to receive a portion of the optical beam.

A processor 134 is operatively connected to the controller 132 and connected to a memory 136. The memory 136 includes instructions recorded thereon that, when read by the processor 134, cause the processor 134 to calculate and provide position data (e.g., location and distance) to the target aircraft 120 based on the time recorded by 114 of when laser light is received.

In the addition, the memory 136 can store coordinates of the field of view in order for the camera 112 to continuously provide location information of the target aircraft 120 to the controller 132. The processor 134 can calculate a new position of the mirror 118 to maintain the field of view 114b in case motion forces on the platform aircraft 110 cause the relative position of target aircraft 120 to momentarily shift. In such instances, the processor 134 is configured to trigger the controller 132 to maintain the lidar system 114 pointing and scanning within the coordinates of the field of regard 114a.

The object detection system 100 can provide several capabilities between the two aircrafts 110, 120 particularly in airborne autonomous refueling. For example, a control unit 116 may be positioned on the platform aircraft 110 operatively connected to the controller 132. The control unit 132 can be arranged to control the platform aircraft 110 to steer the platform aircraft 110 to a position for connecting the fuel feeder 142 of the target aircraft 120 to the platform aircraft 110. Furthermore, the control unit 132 on the platform aircraft 110 can be operatively connected to a control unit 122 on the target aircraft 120 and is arranged to steer either the target aircraft 120 or the platform aircraft 110 to position fuel feeder 142 until connection with aircraft 110.

As will be appreciated by one skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The system of the present disclosure, as described above and shown in the drawings, provide for a two stage detection system with superior properties including a first stage to scan a wide area to locate a target and a second stage to narrow the relative position and distance to the target. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An object detection system, comprising:
    a camera mounted to a platform aircraft configured to define a field of regard containing a target aircraft;
    a lidar system mounted to the platform aircraft configured to continuously scan the field of regard defined by the camera and determine position data between the platform aircraft and the target aircraft; and
    a controller operatively connected to the camera and the lidar system configured to activate the lidar system after the camera defines the field of regard.

2. The detection system of claim 1, wherein the camera defines the field of regard based on thermal signature produced from the target aircraft.

3. The detection system of claim 1, wherein the lidar system includes at least one laser configured to direct an optical beam within a field of view of the lidar system and a detection system configured to receive a reflected portion of the optical beam from the field of view.

4. The detection system of claim 3, further comprising a scanning mechanism including a mirror, positioning motors, and encoders or resolvers to determine pointing angle configured to point the lidar laser and receiver field of view.

5. The detection system of claim 4, further comprising:
    a processor operatively connected to the camera and lidar device connected to a memory, wherein the memory includes instructions recorded thereon that, when read by the processor, cause the processor to:
    receive the portion of the laser beam from the field of view; and
    provide distance to the target aircraft.

6. The detection system of claim 5, wherein the memory is configured to store coordinates of the field of regard.

7. The detection system of claim 6, wherein the controller is operatively connected to the memory and wherein the controller is configured to trigger the memory to maintain the lidar system pointing and scanning within the coordinates of the field of regard.

8. The detection system of claim 1, wherein the camera and lidar system are mounted for scanning the target aircraft with the target aircraft positioned above the platform aircraft.

9. The detection system of claim 1, further comprising a control unit on the platform aircraft operatively connected to the controller, wherein the control unit is arranged to control the platform aircraft to steer the platform aircraft to a position for connecting a fuel feeder and nozzle of the target aircraft to the platform aircraft.

10. The detection system of claim 9, wherein the lidar system is configured to provide a three dimensional image to determine location of the fuel feeder and nozzle relative to the platform aircraft.

11. The detection system of claim 1, wherein the control unit on the platform aircraft is operatively connected to the target aircraft and is arranged to steer the target aircraft to avoid airborne objects.

12. An object detection system, comprising:
    a camera mounted to a platform aircraft configured to define a field of regard containing a target aircraft;
    a lidar system mounted to the platform aircraft configured to continuously scan the field of regard defined by the camera;

a controller operatively connected to the camera and the lidar system configured to activate the lidar system after the camera defines the field of regard; and a processor operatively connected to the camera and lidar system connected to a memory, wherein the memory is configured to store coordinates of the field of regard and wherein the memory includes instructions recorded thereon that, when read by the processor, cause the processor to provide position data of the target aircraft relative to the platform aircraft, wherein the controller is configured to trigger the memory to maintain the lidar system pointing and scanning within the coordinates of the field of regard.

13. The detection system of claim 12, wherein the camera and lidar system are mounted for scanning the target aircraft with the target aircraft positioned above the platform aircraft.

14. The detection system of claim 12, further comprising a control unit on the platform aircraft operatively connected to the controller, wherein the control unit is arranged to control the platform aircraft to steer the platform aircraft to a position for connecting a fuel feeder and nozzle of the target aircraft to the platform aircraft.

15. The detection system of claim 12, wherein the control unit on the platform aircraft is operatively connected to a control unit on the target aircraft.

16. The detection system of claim 15, wherein the control unit on the platform aircraft arranged to steer the target aircraft to avoid airborne objects.

17. A method of detecting an object, the steps comprising:
triggering a camera mounted to a platform aircraft to define a field of regard containing a target aircraft;
communicating the field of regard coordinates to a controller operatively connected to the camera;
activating a lidar system operatively connected to the controller and mounted to the platform aircraft to continuously scan the field of regard defined by the camera; and
determining position data between the platform aircraft and the target aircraft.

18. The detection system of claim 1, wherein the lidar system includes at least one laser configured to direct an optical beam within the field of regard defined by the camera.

19. The detection system of claim 1, wherein the lidar system includes a lidar receiver and detection system part configured to receive a portion of the an optical emitted by a laser of the lidar system.

20. The detection system of claim 1, further comprising a scanning mechanism including a mirror, positioning motors, and encoders or resolvers to determine pointing angle scans of a field of view of the lidar system.

* * * * *